(12) United States Patent
Chang et al.

(10) Patent No.: US 11,269,387 B2
(45) Date of Patent: Mar. 8, 2022

(54) POWER SUPPLY STRUCTURE OF DESKTOP COMPUTER

(71) Applicant: SEA SONIC ELECTRONICS CO., LTD., Taipei (TW)

(72) Inventors: Hsiu-Cheng Chang, Taipei (TW); Cheng-Yung Lo, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 16/879,843

(22) Filed: May 21, 2020

(65) Prior Publication Data
US 2021/0365085 A1 Nov. 25, 2021

(30) Foreign Application Priority Data
May 20, 2020 (TW) .................. 109116608

(51) Int. Cl.
*G06F 1/00* (2006.01)
*G06F 1/18* (2006.01)
*G06F 1/26* (2006.01)
*G06F 1/3203* (2019.01)

(52) U.S. Cl.
CPC .............. *G06F 1/189* (2013.01); *G06F 1/188* (2013.01); *G06F 1/26* (2013.01); *G06F 1/3203* (2013.01)

(58) Field of Classification Search
CPC ............. G06F 1/189; G06F 1/188; G06F 1/26
USPC ........................................................ 713/300
See application file for complete search history.

(56) References Cited

U.S. PATENT DOCUMENTS

| 5,865,518 | A  | * | 2/1999  | Jarrett ..................... | G06F 1/186 312/223.2 |
| 6,046,912 | A  | * | 4/2000  | Leman ..................... | G06F 1/184 361/679.4 |
| 2004/0012929 | A1 | * | 1/2004  | Chen ......................... | G06F 1/18 361/727 |
| 2006/0209500 | A1 | * | 9/2006  | Park ......................... | G06F 1/181 361/679.6 |
| 2006/0285293 | A1 | * | 12/2006 | Toyoda ..................... | G06F 1/20 361/695 |

(Continued)

FOREIGN PATENT DOCUMENTS

| CN | 201707631 U | 1/2011 |
| CN | 208369484 U | 1/2019 |
| TW | M274580 U | 9/2005 |

*Primary Examiner* — Nolvick Derose
(74) *Attorney, Agent, or Firm* — Muncy, Geissler, Olds & Lowe, P.C.

(57) ABSTRACT

The invention provides a power supply structure of a desktop computer, a mainboard to which the desktop computer belongs comprises a mainboard power input port. The power supply structure comprises a cabinet, a power supply device, a power adapting device and a mainboard power supply line. The cabinet comprises a cabinet inner space and a bearing plate. The cabinet inner space is divided into a mainboard mounting side provided for the mainboard to be disposed thereon and a back side. The bearing plate comprises a first through hole. The power adapting device is disposed in the cabinet and located at the back side. The power adapting device comprises a power source input port and a mainboard power supply port penetrating through the first through hole. The mainboard power supply line is connected with the mainboard power supply port and the mainboard power input port.

14 Claims, 7 Drawing Sheets

(56) References Cited

U.S. PATENT DOCUMENTS

| | | | |
|---|---|---|---|
| 2007/0081308 A1* | 4/2007 | Ishida | H05K 7/1492 |
| | | | 361/724 |
| 2011/0090646 A1* | 4/2011 | Chen | G06F 1/188 |
| | | | 361/679.58 |
| 2012/0270417 A1* | 10/2012 | Lorentzen | G06F 13/4072 |
| | | | 439/55 |
| 2015/0022971 A1* | 1/2015 | Jung | G06F 1/189 |
| | | | 361/679.58 |

* cited by examiner

POWER SUPPLY STRUCTURE OF DESKTOP COMPUTER

FIELD OF THE INVENTION

The invention relates to a power supply structure of a computer, in particular to a power supply structure for reducing wiring by a power adapting device.

BACKGROUND OF THE INVENTION

Many patents provide desktop computers with simplified wiring in a cabinet, such as CN 208369484, TWM274580, CN 201707631U and the like. The above-mentioned patents simplify the wiring by using a power adapter commonly known as a hub, the power adapters provided in the above-mentioned patents are arranged on a same side of a cabinet as a mainboard, a display card and the like. Although the wiring is reasonably simplified, the power adapter occupies the mounting space on the same side of the cabinet and is easy to interfere with other components, causing the consumers often quit using it after installation. In addition, the above-mentioned power adapter is designed to reduce the wire clutter caused by the connections between the devices, but fails to consider how to reduce the wire length of each wire under the same requirement, so that the wiring in the cabinet is just connected in fragment but not preferably simplified.

SUMMARY OF THE INVENTION

The main object of the present invention is to solve the problem of the conventional technique fails to specifically reduce wiring in a cabinet.

In order to achieve the object, the invention provides a power supply structure of a computer, a mainboard to which the computer belongs comprising a mainboard power input port with a position defined on the basis of ATX specifications. The power supply structure comprises a cabinet, a power supply device, a power adapting device, and a mainboard power supply line. The cabinet is provided with a cabinet inner space and a bearing plate arranged in the cabinet inner space, the cabinet inner space is divided into a mainboard mounting side and a back side based on the bearing plate. A side of the bearing plate which faces the mainboard mounting side is provided for the mainboard to be disposed thereon, and the bearing plate comprises a first through hole adjacent to the mainboard power input port. The power supply device is arranged in the cabinet. The power adapting device is arranged in the cabinet and located at the back side, and the power adapting device comprises a power source input port connected with the power supply device and a mainboard power supply port penetrating through the first through hole to be exposed on the mainboard mounting side. The mainboard power supply line is connected with the mainboard power supply port and the mainboard power input port.

In one embodiment, the power adapting device comprises a housing assembled with the cabinet. The housing comprises a first surface facing the mainboard mounting side, a second surface opposite to the first surface, and a side edge connecting the first surface and the second surface. The mainboard power supply port is provided on the first surface, and the power source input port is provided on the side edge.

In one embodiment, the power adapting device comprises a plurality of power supply ports disposed on the side edge.

In one embodiment, the bearing plate is provided with at least one second through hole, and the power adapting device is provided with at least one display card power supply port which is located on a same side as the mainboard power supply port and penetrates through the second through hole to be exposed on the mainboard mounting side.

In one embodiment, the bearing plate is divided into a first area where the mainboard is provided and a second area where the mainboard is not provided based on a mounting position of the mainboard, and the bearing plate comprises a drop between the first area and the second area.

In one embodiment, the mainboard power input port is 20-pin or 24-pin.

Accordingly, the invention has the following characteristics compared with the prior art. In the present invention, the power adapter is arranged on the back side of the cabinet, and will not occupy the space of the cabinet in the mainboard mounting side. The bearing plate of the present invention is provided with the first through hole at the position close to the mainboard power supply port, and after the power adapter is assembled, the mainboard power supply port to which the power adapter belongs penetrates through the first through hole and is close to the mainboard power input port, so that a length of the mainboard power supply line is specifically shortened, wherein the mainboard power supply line may be implemented at the shortest distance.

DETAILED DESCRIPTION OF THE PREFERRED EMBODIMENTS

Figure 1:
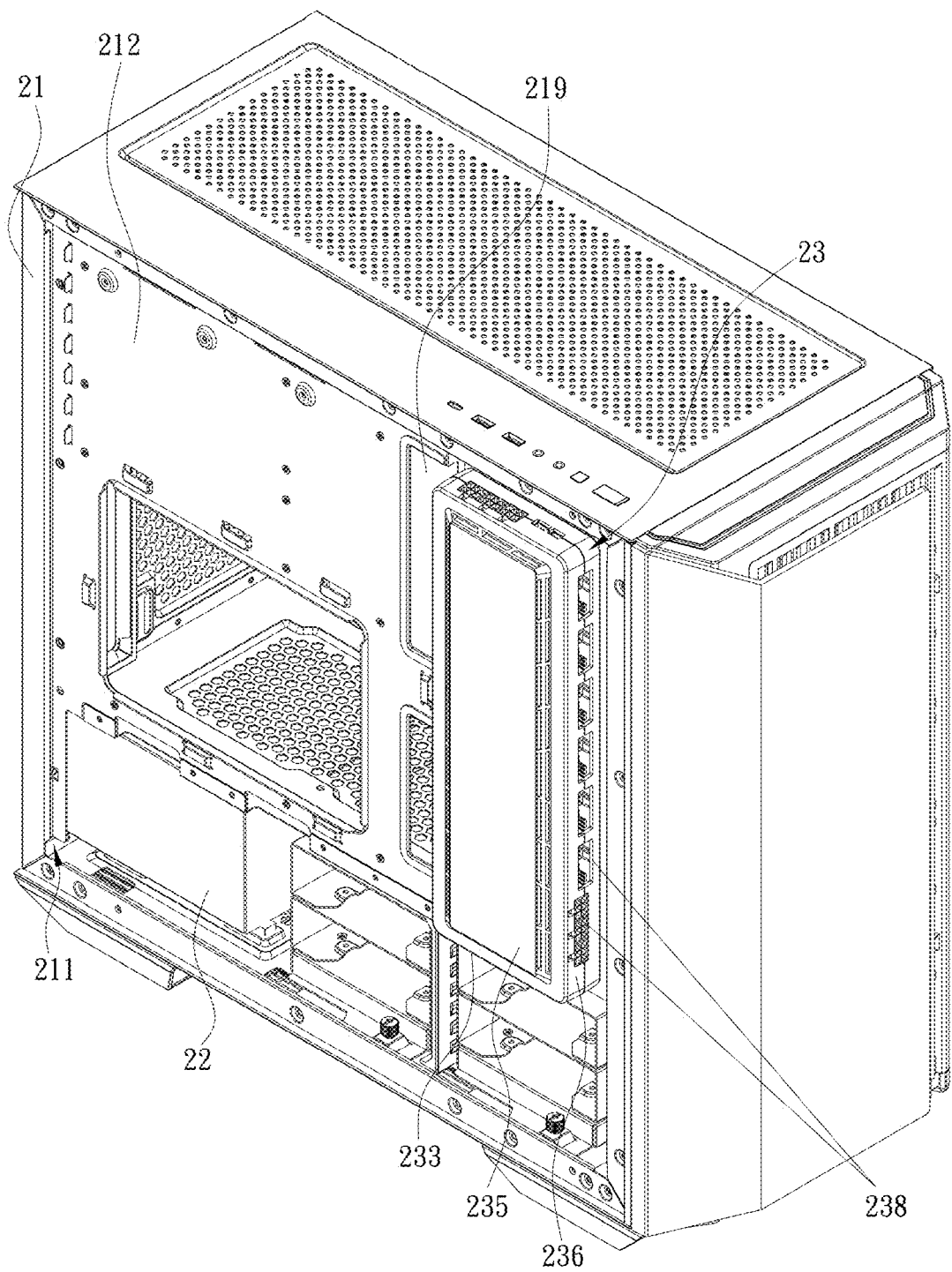
FIG. 1 is a schematic view of the back side of the cabinet of an embodiment of the present invention.

The detailed description and technical contents of the present invention will now be described with reference to the drawings as follows:

Referring to FIG. 1, FIG. 2, FIG. 3, FIG. 4, and FIG. 5, the present invention provides a power supply structure of a desktop computer, and a mainboard 10 to which the desktop computer belongs is designed based on ATX (advanced technology extended) specifications, which referred to herein are made by Intel in 1995. It is to be understood that the mainboard 10 of the present invention is not limited to ATX specifications and encompasses the next generation of specifications that extent on the basis of ATX specifications. Further, the mainboard 10 comprises a mainboard power input port 101 with a position defined based on ATX specifications. The mainboard power input port 101 is 24-pin or 20-pin.

On the other hand, the power supply structure includes a cabinet 21, a power supply device 22, a power adapting device 23, and a mainboard power supply line 24. The cabinet 21 comprises a cabinet inner space 211 and a bearing plate 212 provided in the cabinet inner space 211. The cabinet inner space 211 of the cabinet 21 is divided into a mainboard mounting side 213 and a back side 214 based on the bearing plate 212, and a side of the bearing plate 212 which faces the mainboard mounting side 213 is provided for the mainboard 10 to be disposed thereon. Further, the bearing plate 212 comprises a first through hole 215 adjacent to the mainboard power input port 101. The first through hole 215 is formed at a position defined by a position of the mainboard 10 on the bearing plate 212, and the first through hole 215 is formed at the position such that the mainboard power supply line 24 can be implemented at a shorter length for the distance.

Figure 3:
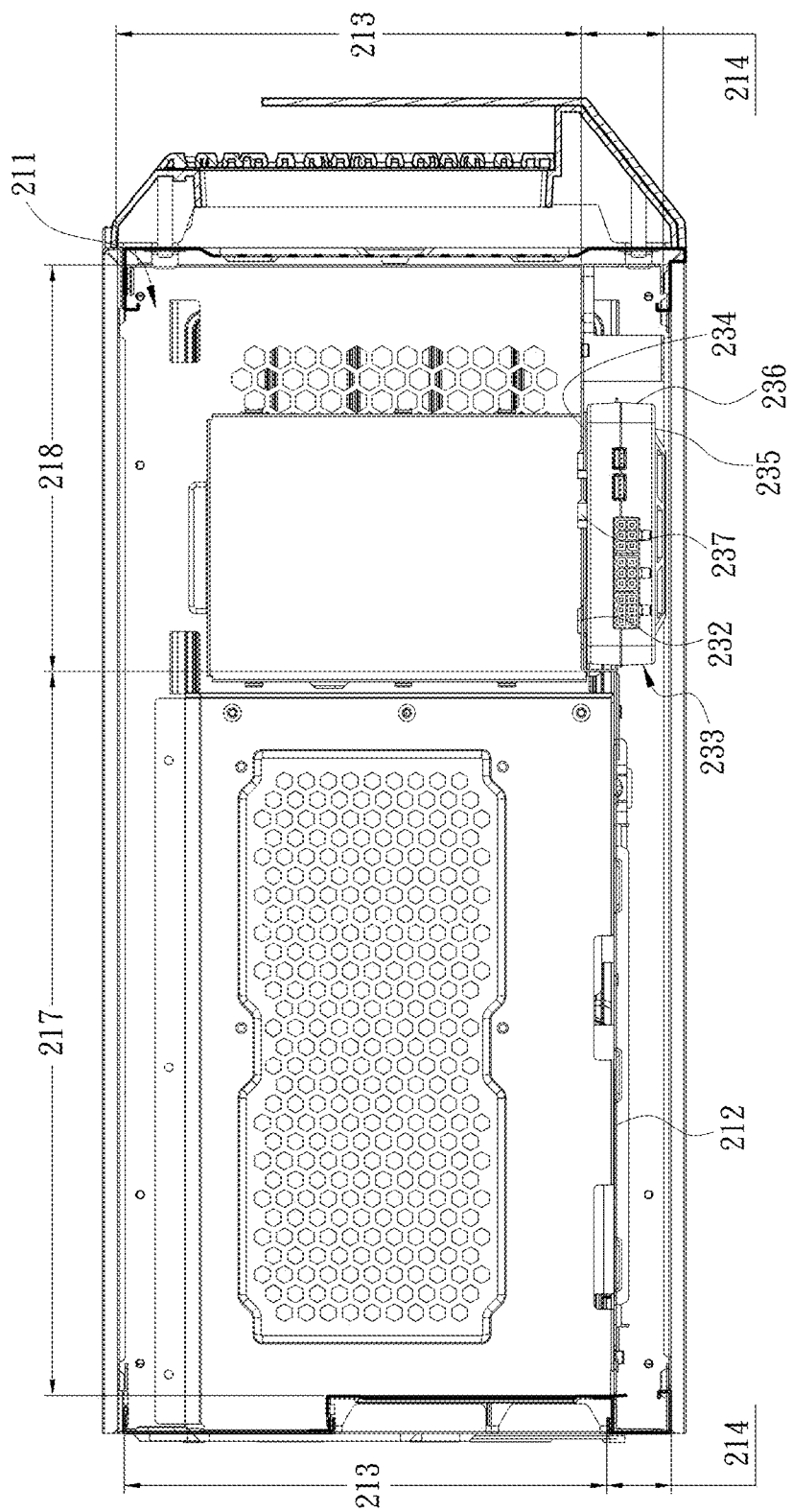
FIG. 3 is a first cross-sectional structural schematic view of an embodiment of the present invention.
Figure 7:
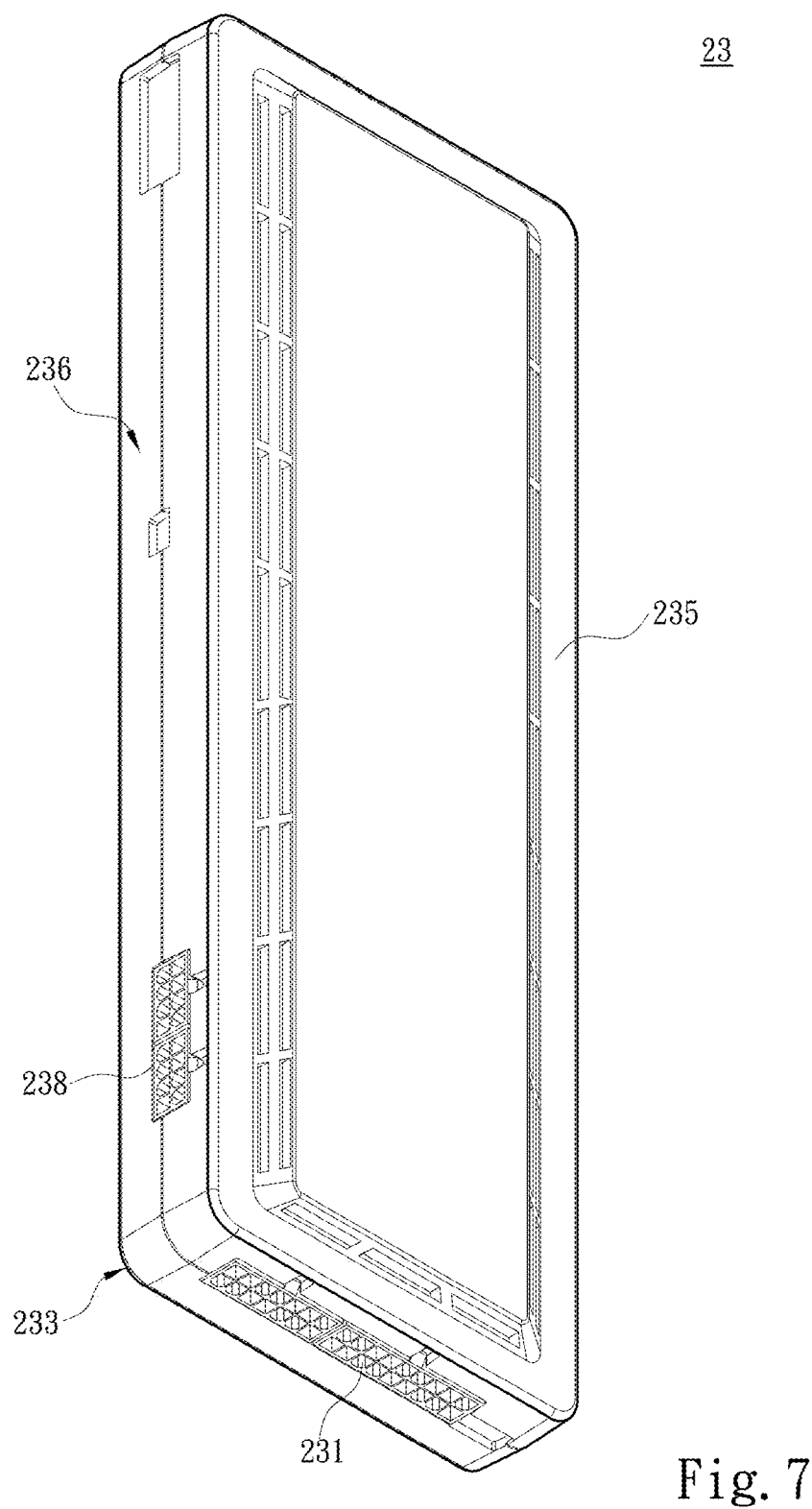
FIG. 7 is a structural schematic view in another direction of the power adapting device of an embodiment of the present invention.

The power supply device 22 is provided in the cabinet 21, and the power supply device 22 has been well known by those of ordinary skill in the art and will not be described in detail herein. Furthermore, the power adapting device 23 of the present invention is different from the structures of current desktop computers that all disposed on the mainboard mounting side 213, but the power adapting device 23 is disposed in the cabinet 21 on the back side 214 as shown in FIG. 1 and FIG. 3. Further, the power adapting device 23 is an independent structure and is able to be disassembled and assembled separately from the cabinet 21. The power adapting device 23 includes a power source input port 231 (as shown in FIG. 7) connected with the power supply device 22 and a mainboard power supply port 232 penetrating through the first through hole 215 to be exposed at the mainboard mounting side 213 and adjacent to the mainboard power input port 101. In one embodiment, the power adapting device 23 comprises a housing 233 assembled with the cabinet 21. The housing 233 comprises a first surface 234 facing the mainboard mounting side 213, a second surface 235 opposite to the first surface 234, and a side edge 236 connecting the first surface 234 and the second surface 235. The mainboard power supply port 232 is provided on the first surface 234, and the power source input port 231 is provided on the side edge 236. It should be understood that the side edge 236 referred to herein includes four sides of the housing 233 and is not limited to the position indicated in FIG. 7. Further, considering that the power adapting device 23 is disposed on the back side 214, in one embodiment, the power adapting device 23 is not provided with any electrical connection port on the second surface 235. Also, the power adapting device 23 is provided with a circuit structure so that power input from the power source input port 231 is output from the mainboard power supply port 232. In addition, a size of the first through hole 215 is not limited to the same size as the mainboard power supply port 232, but may be slightly larger than the mainboard power supply port 232.

The mainboard power supply line 24 is connected with the mainboard power supply port 232 and the mainboard power input port 101, so that the power output from the power supply device 22 is transmitted to the mainboard 10 through the power adapting device 23 and the mainboard power supply line 24. The mainboard power supply port 232 is arranged adjacent to the mainboard power input port 101, thereby the connection distance between the mainboard power supply port 232 and the mainboard power input port 101 is shorter, so that the wiring within the cabinet 21 is specifically reduced.

Referring to FIG. 2, FIG. 3, FIG. 4, FIG. 5, FIG. 6, and FIG. 7, in one embodiment, the power adapting device 23 comprises at least one display card power supply port 237 located on a same side as the mainboard power supply port 232. The bearing plate 212 is not only configured with the first through hole 215, but also configured with at least one second through holes 216 located corresponding to the display card power supply port 237. When the power adapting device 23 and the cabinet 21 are assembled, the display card power supply port 237 would penetrate through the second through hole 216 to be exposed at the mainboard mounting side 213, and the display card power supply port 237 is connected with a display card power input port 111 of a display card 11 provided on the mainboard 10 through an electrical line (not shown in the figures). In addition, the display card power supply port 237 is not limited to include a single electrical connector, but it may include more than one electrical connector.

Figure 2:
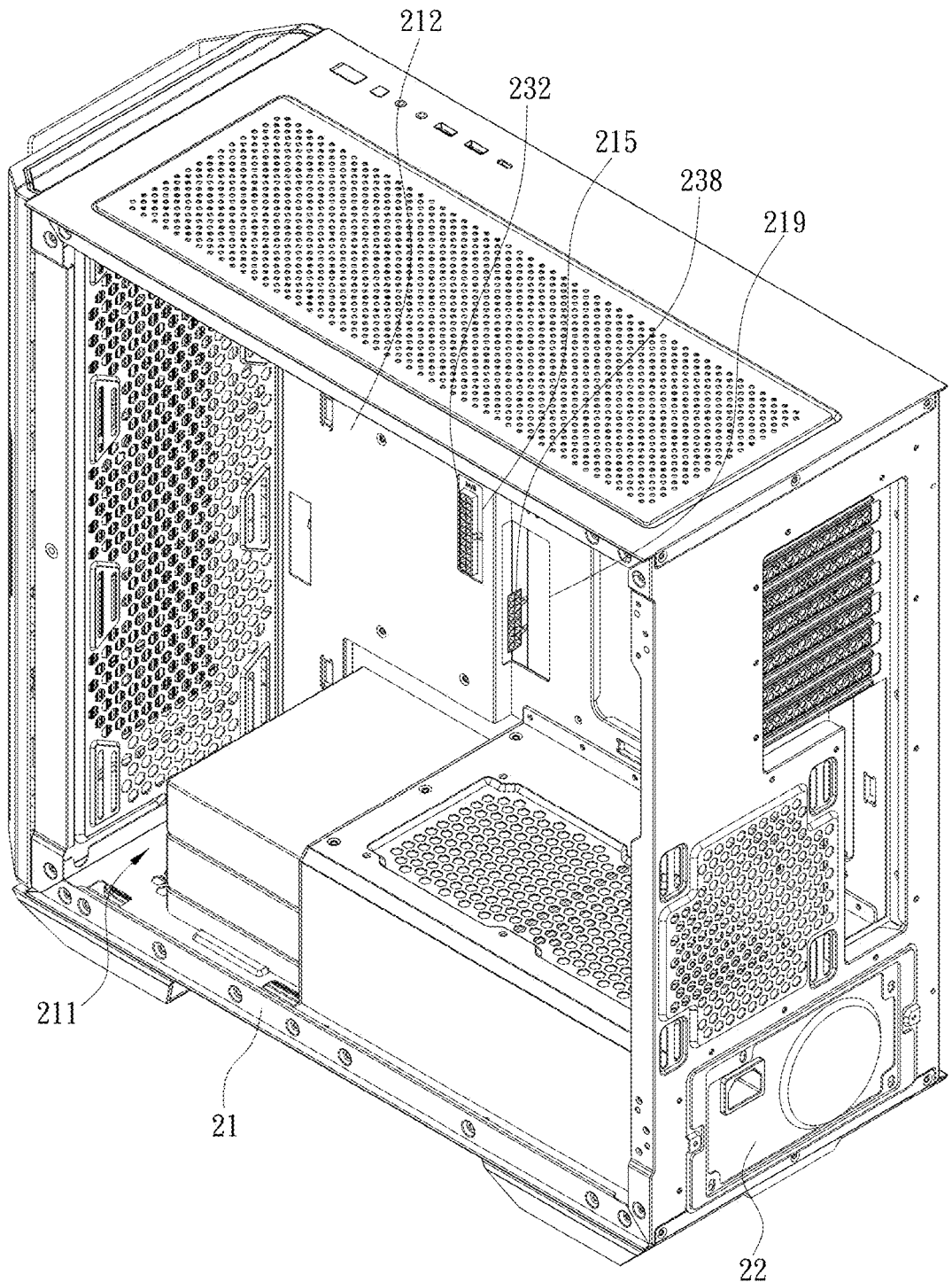
FIG. 2 is a schematic view of the mainboard mounting side of the cabinet of an embodiment of the present invention.
Figure 6:
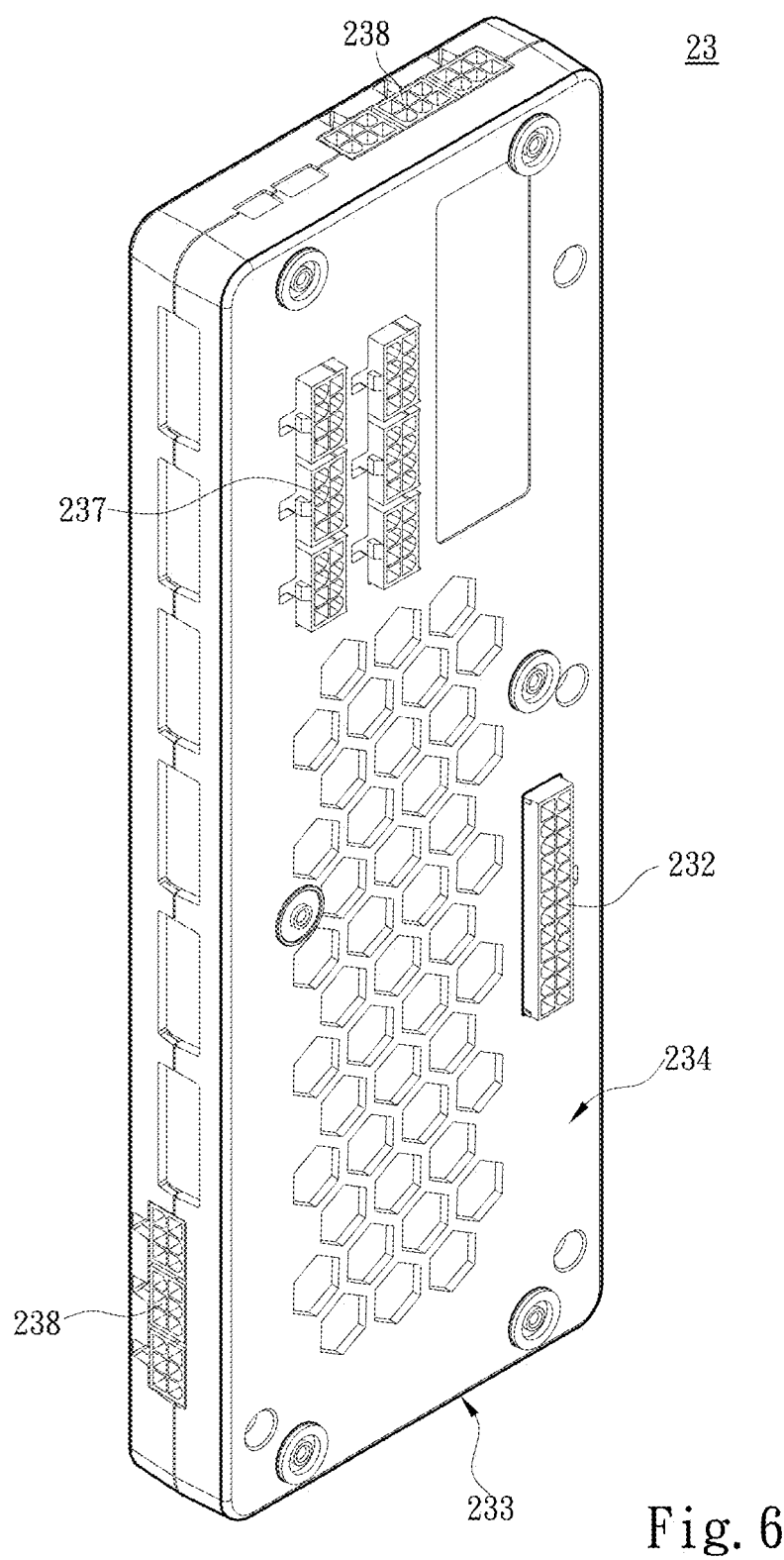
FIG. 6 is a structural schematic view of the power adapting device of an embodiment of the present invention.

Referring to FIG. 2, FIG. 6, and FIG. 7, in one embodiment, the power adapting device 23 comprises a plurality of power supply ports 238 disposed on the side edge 236. The plurality of power supply ports 238 are designed to be disposed on different sides of the side edge 236 rather than being limited to be on a same side. Further, the plurality of power supply ports 238 is not limited to comprise same amount of pins. In addition, the power adapting device 23 of the present invention is not limited to simply provide the function of adapting power, but in some embodiments, the power adapting device 23 further comprises a power conversion module, a power management module, a fan control module or the like. In one embodiment, the power adapting device 23 comprises the power conversion module (not shown in the figures), wherein the power conversion module is connected to the power source input port 231, the mainboard power supply port 232, the display card power supply port 237 and the plurality of power supply ports 238. The power conversion module directly or indirectly obtains the power provided by the power supply device 22 from the power source input port 231, and the power conversion module converts the obtained power based on its own circuit design. For example, when the power provided by the power supply device 22 is 12V, the power conversion module converts the power and generates output power of 12V, 3.3V and 5V. Thereafter, the power conversion module supplies power to the mainboard power supply port 232, the display card power supply port 237, and the plurality of power supply ports 238 based on the circuit design in the power adapting device 23.

Figure 4:
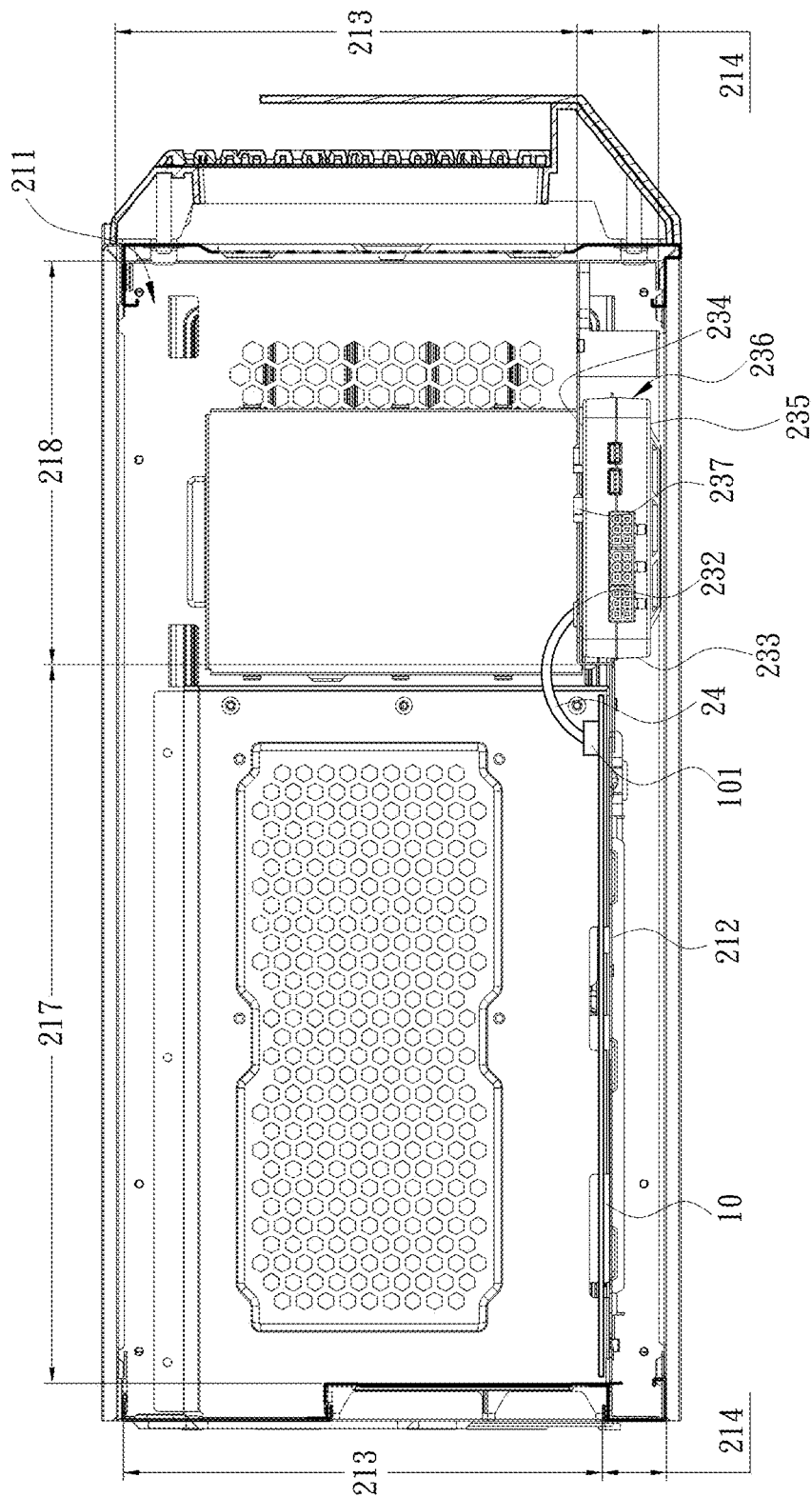
FIG. 4 is a second cross-sectional structural schematic view of an embodiment of the present invention.
Figure 5:
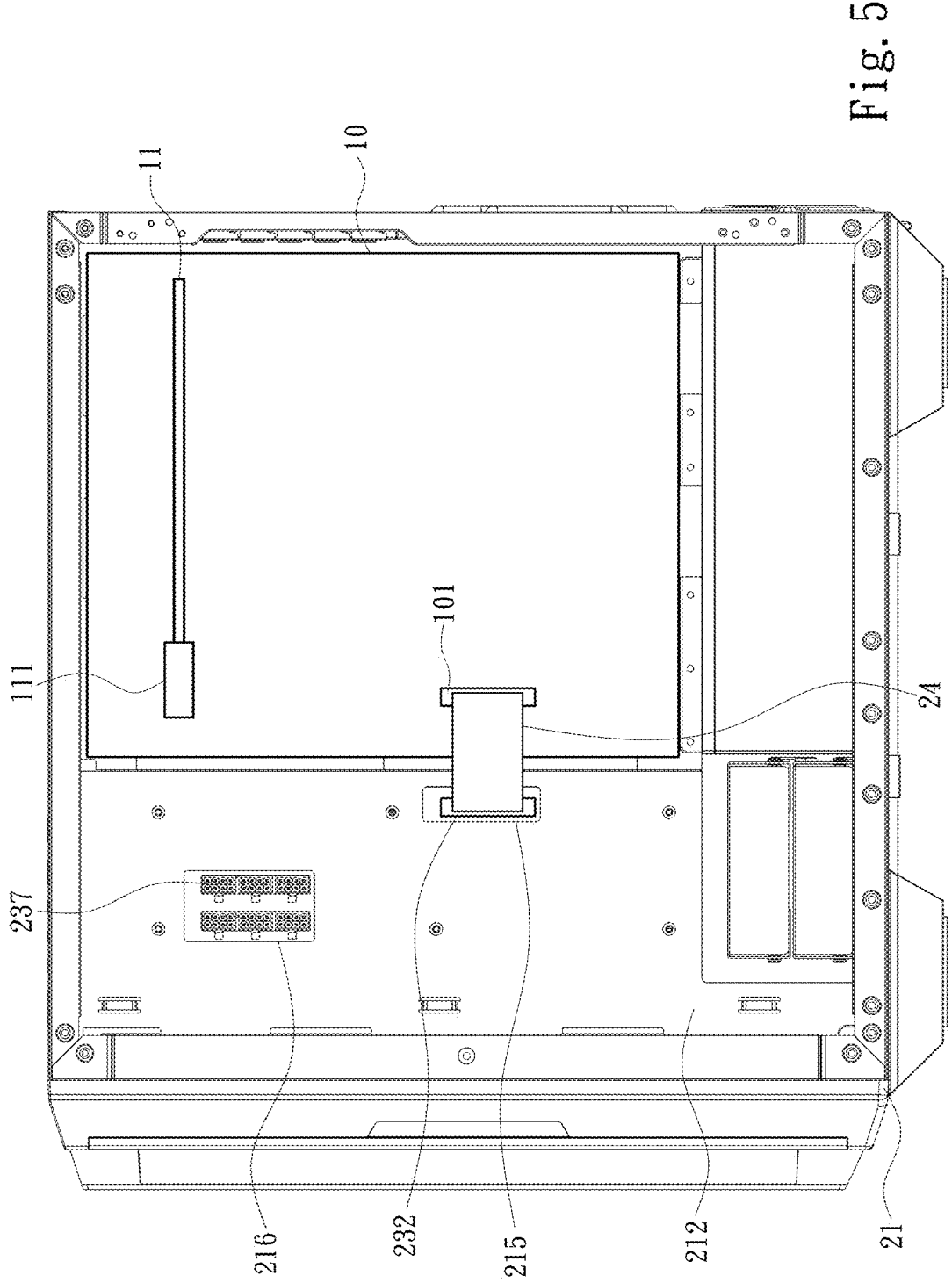
FIG. 5 is a front schematic view of the mainboard mounting side of the cabinet of an embodiment of the present invention.

Referring to FIG. 3 and FIG. 4, in one embodiment, based on the mounting position of the mainboard 10, the bearing plate 212 is divided into a first area 217 where the mainboard 10 is provided and a second area 218 where the mainboard 10 is not provided. There is a drop between the first area 217 and the second area 218. In the embodiment, the first area 217 is lower than the second area 218, and one side of the power adapting device 23 is disposed along the drop between the first area 217 and the second area 218. Besides, when the power adapting device 23 is provided with the plurality of power supply ports 238, the bearing plate 212 is provided with at least one third through hole 219 at the fall. After the power adapting device 23 is assembled with the cabinet 21, the plurality of power supply ports 238 are located within the third through hole 219.

What is claimed is:

1. A power supply structure of a desktop computer, a mainboard to which the desktop computer belongs comprising a mainboard power input port with a position defined based on ATX specifications, the power supply structure comprising:

a cabinet, provided with a cabinet inner space and a bearing plate arranged in the cabinet inner space, the cabinet inner space divided into a mainboard mounting side and a back side based on the bearing plate, a side of the bearing plate which faces the mainboard mounting side provided for the mainboard to be disposed thereon, and the bearing plate comprising a first through hole adjacent to the mainboard power input port;

a power supply device, disposed in the cabinet;

a power adapting device, disposed in the cabinet and located at the back side, the power adapting device comprising a power source input port connected with the power supply device and a mainboard power supply port penetrating through the first through hole to be exposed on the mainboard mounting side; and a mainboard power supply line, connected with the mainboard power supply port and the mainboard power input port;

wherein the bearing plate is divided into a first area where the mainboard is provided and a second area where the mainboard is not provided based on a mounting position of the mainboard, and the bearing plate comprises a drop between the first area and the second area.

2. The power supply structure of a desktop computer as claimed in claim 1, wherein the power adapting device comprises a housing assembled with the cabinet, the housing comprises a first surface facing the mainboard mounting side, a second surface opposite to the first surface, and a side edge connecting the first surface and the second surface, the mainboard power supply port is provided on the first surface, and the power source input port is provided on the side edge.

3. The power supply structure of a desktop computer as claimed in claim 2, wherein the power adapting device comprises a plurality of power supply ports disposed on the side edge.

4. The power supply structure of a desktop computer as claimed in claim 3, wherein the bearing plate is provided with at least one second through hole, and the power adapting device is provided with at least one display card power supply port which is located on a same side as the mainboard power supply port and penetrates through the second through hole to be exposed on the mainboard mounting side.

5. The power supply structure of a desktop computer as claimed in claim 4, wherein the mainboard power input port is 20-pin or 24-pin.

6. The power supply structure of a desktop computer as claimed in claim 3, wherein the mainboard power input port is 20-pin or 24-pin.

7. The power supply structure of a desktop computer as claimed in claim 2, wherein the bearing plate is divided into a first area where the mainboard is provided and a second area where the mainboard is not provided based on a mounting position of the mainboard, the bearing plate comprises a drop between the first area and the second area.

8. The power supply structure of a desktop computer as claimed in claim 7, wherein the mainboard power input port is 20-pin or 24-pin.

9. The power supply structure of a desktop computer as claimed in claim 2, wherein the bearing plate is provided with at least one second through hole, and the power adapting device is provided with at least one display card power supply port which is located on a same side as the mainboard power supply port and penetrates through the second through hole to be exposed on the mainboard mounting side.

10. The power supply structure of a desktop computer as claimed in claim 9, wherein the mainboard power input port is 20-pin or 24-pin.

11. The power supply structure of a desktop computer as claimed in claim 1, wherein the bearing plate is divided into a first area where the mainboard is provided and a second area where the mainboard is not provided based on a mounting position of the mainboard, the bearing plate comprises a drop between the first area and the second area.

12. The power supply structure of a desktop computer as claimed in claim 11, wherein the mainboard power input port is 20-pin or 24-pin.

13. The power supply structure of a desktop computer as claimed in claim 1, wherein the bearing plate is provided with at least one second through hole, and the power adapting device is provided with at least one display card power supply port which is located on a same side as the mainboard power supply port and penetrates through the second through hole to be exposed on the mainboard mounting side.

14. The power supply structure of a desktop computer as claimed in claim 13, wherein the mainboard power input port is 20-pin or 24-pin.

* * * * *